United States Patent [19]

Nishino

[11] Patent Number: 4,597,552
[45] Date of Patent: Jul. 1, 1986

[54] SEAT ADJUSTER
[75] Inventor: Takaichi Nishino, Akishima, Japan
[73] Assignee: Patent Service Corporation, Tokyo, Japan
[21] Appl. No.: 589,218
[22] Filed: Mar. 13, 1984
[51] Int. Cl.$^4$ ............................................. F16M 13/00
[52] U.S. Cl. ..................................... 248/429; 297/346; 312/343
[58] Field of Search ............... 248/429, 420, 430, 424, 248/371, 394, 396, 573, 574; 297/346, 216, 317, 322; 312/343, 346; 308/3.6

[56] References Cited
U.S. PATENT DOCUMENTS

| | | | |
|---|---|---|---|
| 2,277,947 | 3/1942 | Bailey | 248/429 |
| 3,790,234 | 2/1974 | Fuelling et al. | 312/343 |
| 4,065,178 | 12/1977 | Carella et al. | 248/430 |
| 4,262,963 | 4/1981 | Bauer et al. | 248/430 |
| 4,371,142 | 2/1983 | Bottemiller et al. | 248/622 |
| 4,478,383 | 10/1984 | Urai | 248/429 |

Primary Examiner—Ramon S. Britts
Assistant Examiner—Ramon O. Ramirez
Attorney, Agent, or Firm—Cushman, Darby & Cushman

[57] ABSTRACT

A seat adjuster for use with a seat used in a vehicle, an airplane or the like is disclosed in which a movable rail is formed integrally with a side frame of a cushion frame, and in which either of the movable rail or a fixed rail fixed to a vehicle body is provided on its surface facing toward the other rail with a plurality of projections so that loads applied to the movable rail can be transmitted to the fixed rail by means of these projections.

6 Claims, 9 Drawing Figures

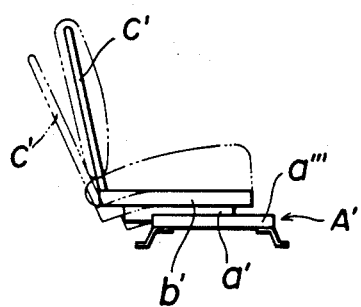
FIG. I(A)
(PRIOR ART)
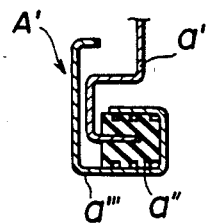
FIG. I(B)
(PRIOR ART)
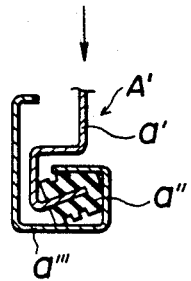
FIG. I(C)
(PRIOR ART)
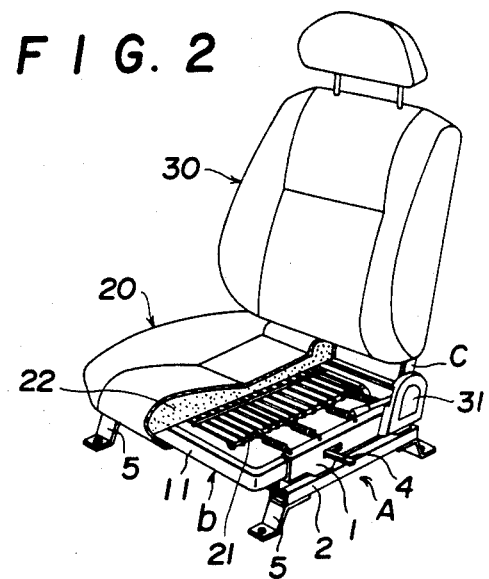
FIG. 2
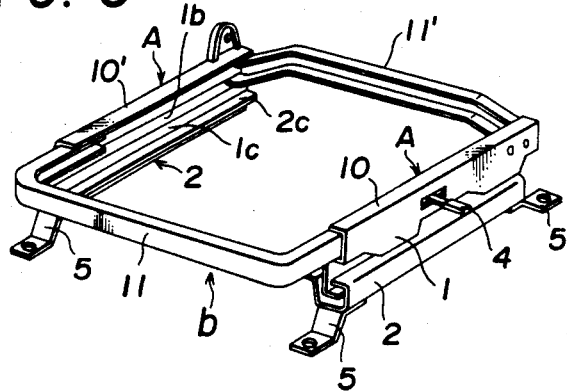
FIG. 3

SEAT ADJUSTER

BACKGROUND OF THE INVENTION

1. Field of the Invention

The present invention relates to a seat adjuster for a seat used in a vehicle, an airplane or the like which is capable of adjustments of the seat by moving it longitudinally and, more particularly, to an improved seat adjuster in which a movable rail provided in a cushion frame is connected to a fixed rail fixed to a portion of the vehicle by means of a slider in such a manner as to be free to slide relative to the fixed rail.

2. Description of the Prior Art

Conventionally, a seat adjuster of this type has been found satisfactory in realizing the weight reduction of the entire seat, partly because there is no need for providing fixing member to fixedly connect a cushion frame of a cushion seat with a movable rail since both such structures are formed as integral parts of the same member. Also, since loads transmitted via a reclining device from a back frame of a back seat are borne directly by a slide adjustment device, the front and rear frame portions of the cushion frame may have sufficient strength to carry the weight of an occupant. It is possible to construct the cushion frame front and rear portions in the form of a thin plate structure. The conventional seat adjuster of this type permits efficient production of the seat since there is no need for mounting the movable rail to the cushion frame during assembly.

However, although the front and rear frame portions of the cushion frame can be advantageously constructed in the form of a thin plate structure as mentioned above, when the movable rails provided respectively in both side frames are constructed in the form of a thin plate structure, the movable rail (a') of a seat adjuster (A') shown in FIG. 1(B) is decreased in rigidity and thus, when any loads greater than a predetermined load are applied, is deformed together with a slider (a"), so that both side frames (b') and a back frame (c') are incapable of maintaining their respective predetermined forms as shown by two-dot chained lines in FIG. 1(A). Also, as illustrated in FIG. 1(C), the deformed slider (a") may impair the mobility (sliding function) of the movable rail. For this reason, the movable rail must be of a greater in thickness which, of course, is not desireable if further weight reduction is to be achieved. In FIGS. 1(A), (B) and (C), reference character (a'") stands for a fixed rail.

SUMMARY OF THE INVENTION

Accordingly, it is a main object of the present invention to provide an improved seat adjuster which can eliminate the above-mentioned drawbacks seen in the conventional device and which is capable of further reducing the weight of the entire seat without impairing any functions of its components.

In order to accomplish the above object, according to the invention, either of a movable rail and a fixed rail is provided on its surface facing towards the other rail with a plurality of projections which are extended therefrom toward the other rail, so that any possible loads applied to the movable rail can be dispersed or transmitted over to the fixed rail by means of said plurality of projections provided in either of these rails.

Accordingly, in accordance with the present invention, since the loads applied to the movable rail are transmitted by means of said plurality of projections over to the fixed rail, there is no possibility of the movable rail and its slider being deformed as in the prior art seat adjuster and thus the movable rail can be smoothly moved relative to the fixed rail. In addition, the invention permits further reduction of the weight of the entire seat since thee is no need for use of a thick movable rail, i.e., a thinner movable rail can be effectively employed.

Another object of the invention is to provide a simple method of producing the seat adjuster. In accomplishing this object, the movable and fixed rails respectively include on one of their surfaces facing toward their mating rails a plurality of projections formed by means of a press working or the like.

BRIEF DESCRIPTION OF THE DRAWINGS

FIG. 1(A) is a side view of a seat incoporating a conventional seat adjuster;

FIG. 1(B) is an end view of the conventional seat adjuster in FIG. 1(A), illustrating a state in which it is not loaded;

FIG. 1(C) is an end view of the same, illustrating a state in which it is loaded;

FIG. 2 is a perspective view of a seat adjuster constructed in accordance with the invention, illustrating the manner in which it is used in a vehicle seat;

FIG. 3 is a perspective view of the seat adjuster of the invention, illustrating the manner in which it is mounted onto a cushion frame;

DETAILED DESCRIPTION OF A PREFERRED EMBODIMENT OF THE PRESENT INVENTION

Figure 4:
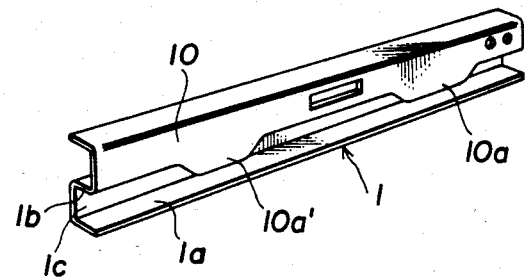
FIG. 4 is a perspective view of a movable rail employed in the invention.

FIG. 2 illustrates a vehicle seat provided with a seat adjuster (A) constructed in accordance with the present invention. In this figure, reference numerals (20), (30) designate a seat cushion and a seat back, respectively. Reference (31) represents a reclining device for adjusting the angle of inclination of the seat back (30), (21) denotes a spring member extended over a cushion frame (b), (22) stands for a cushion of a foam material, and (A), as mentioned above, designates a seat adjuster.

In FIG. 3, there is shown a cushion frame (b) provided with the seat adjuster (A) of the invention. Cushion frame (b) can be constructed by connecting together two front and rear frame portions (11) and (11') with two side frame portions (10) and (10') by adhesion using an adhesive, by welding, by bolting or by riveting to form a quadrilateral configuration. These front and rear frame portions (11),(11') and side frame portions (10), (10') may be made of a metal plate or a hard synthetic resin. Each of the side frame portions (10),(10') is provided in its lower portion with an integrally formed movable rail (1), and this movable rail (1) is slidably connected by means of a slider (3a) or (3b) to a fixed rail (2) or (2') fixedly secured to a portion of a vehicle body.

FIG. 4 illustrates a movable rail (1) formed integrally with a side frame (10). Movable rail (1) is composed of an upper flange (1b), a lower flange (1a) and a vertical portion (1c). Right and left movable rails (1) are respectively formed such that their respective openings are located outwardly, and side frames (10),(10') are fixedly secured at their respective ends to the front and rear frame portions (11),(11').

In the front and rear portions of its upper flange (1b) which faces toward its associated fixed rail (2), the illustrated movable rail (1) is provided with two projections (10a),(10a') which are extended toward the upper surface of the fixed rail (2). Although the two projections are provided in the illustrated embodiment, three or more projections may be provided as necessary. The projection (10a) is preferably located adjacent to the reclining device (31) which is provided in the rear portion of the movable rail (1). These projections (10a), (10a') are press-formed during formation of the upper flange (1b) as well as are projected to provide such a clearance between themselves and the upper surface of the fixed rail (2) that permits smooth movement of the movable rail (1). In case of the movable rails (1),(1') of a hard synthetic resin, such projections (10a),(10a') can be formed at the same time when the movable rails are formed.

Figure 5:
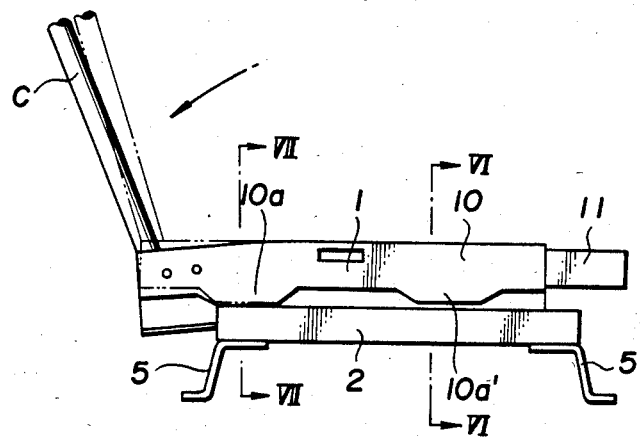
FIG. 5 is a side view of the seat adjuster of the invention.
Figure 6:
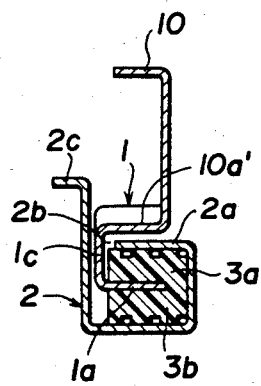
FIG. 6 is an end view taken along line VI—VI in FIG. 5.
Figure 7:
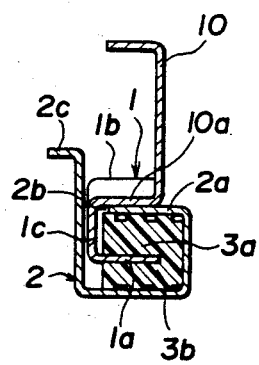
FIG. 7 is an end view taken along line VII—VII in FIG. 5.

FIGS. 5, 6 and 7 illustrate how the movable rail (1) is connected with the fixed rail (2). In the drawings, the fixed rail designated by reference (2) is constructed in a prismatic form and is formed with a guide groove (2b) into which the vertical portion (1c) of the movable rail (1). Within the fixed rail (2) there is inserted the lower flange (1a) of the movable rail (1) which is provided with sliders (3a),(3b) on its upper and lower surfaces respectively. One of the fixed rails (2) includes an upper edge portion (2c) extended horizontally and is conventionally formed with a toothed portion (not shown) at its end, into which there is engaged and locked a stopper of a lock device (not shown) fixed to the side frame (10). In FIGS. 2 and 3, reference numeral (4) represents a lever for lock releasing, and (5),(5) denote leg members for fixing the fixed rail (2) to the floor surface of the vehicle body, respectively.

Sliders (3a),(3b) are formed of a synthetic resin in a manner that the movable rail (1) can be smoothly slided relative to the fixed rail (2). The illustrated sliders (3a),(3b) are fixed to the lower flange (1a) of the movable rail (1) such that they are free to slide relative to the fixed rail (2). Such sliders (3a),(3b) can be replaced by rolls or other suitable members which are not fixed to the lower flange (1a) of the movable rail (1).

FIG. 6 illustrates a state in which no load is being applied to the projection (10a) of the movable rail (1). As shown in this figure, there is provided a clearance between the projection (10a) and the upper flange (2a) of the fixed rail (2).

FIG. 7 illustrates a state in which loads are applied in a direction of an arrow in FIG. 5, that is, loads are given to the back frame (c). When such loads are applied to the back frame (c), they are centered onto the side frame portions (10),(10) on the back frame (c) side and thus these side frame portions (10),(10) are sagged downwardly, while the projection (10a) of the movable rail (1) is abutted against the upper surface of the fixed rail (2) to disperse the loads applied to the side frame (10),(10) over to the fixed rail (2) so as to prevent the lower flange (1a) of the movable rail (1) and sliders (3a),(3b) from deforming.

Although the above mentioned projections (10a),(10a') are provided on the movable rail (1) in the illustrated embodiment, they may be arranged on the upper flange (2a) of the fixed rail (2) to provide similar effects.

As described before, according to the invention, since one of the movable and fixed rails is provided with a plurality of projections on its surface which faces toward the other rail, loads applied to the movable rail can be dispersed via such projections over to the fixed rail against which the projections are abutted. As a result of this, the rigidity of both of the movable and fixed rails is increased, and thus these rails can be formed of a thin plate respectively so as to reduce their weights. In addition, the sliding parts such as the movable rail and sliders are not deformed so much, and therefore after removal of the loads a small working resistance is obtained, which provides an excellent slidability.

What is claimed is:

1. A seat adjuster for a vehicle seat comprising:
   a pair of separated fixed rails each adapted to be fixedly secured to a floor of the vehicle;
   a seat frame including an opposing pair of separated side frame members, each said side frame member including an integral movable rail, said movable rail having a flange;
   slider means for coupling each said flange of said movable rail to a respective said fixed rail so as to permit slidable reciprocal movements of each said movable rail, and thus said seat frame, relative to said fixed rail, and
   means defining integral projections formed on one of said pair of fixed and movable rails and opposingly extending towards the other one of said pair of fixed and movable rails so as to normally establish a clearance therewith, said means defining integral projections longitudinally spaced along one of said pair of fixed and movable rails for abutting against said opposing other one of said pair of fixed and movable rails in response to an excessive load being applied to the seat to distribute the applied load over said opposing other one of said pair of fixed and movable rails thereby preventing deformation of said movable rail and the flange thereof due to said applied loads.

2. The seat adjuster for a vehicle seat according to claim 1, wherein said means defining integral projections are press-formed at the same time when said one of said pair of fixed and movable rails is formed.

3. The seat adjuster for a vehicle seat according to claim 1 wherein each said fixed rail includes an inwardly-directed U-shaped portion and wherein each said movable rail includes an outwardly-directed U-shaped portion positioned so that said flange is accepted within said inwardly-directed U-shaped portion of said respective fixed rail.

4. The seat adjuster for a vehicle seat according to claim 1 wherein said means defining integral projections defines a pair of integral projections positioned at front and rear ends, respectively, of said one of said pair of fixed and movable rails.

5. The seat adjuster for a vehicle seat according to claim 1 wherein said seat frame includes front and rear frame portions and wherein said side frame members are respectively connected at both ends with said front and rear frame portions of said said seat frame to form a quadilateral configuration.

6. A seat adjuster for a vehicle seat comprising:
   a pair of separated fixed rails adapted for securement to a vehicle floor;
   a seat frame including an opposing pair of separated side frame members, each said side frame member including an integral movable rail having a rail flange; and slider means for coupling each said rail flange of said movable rails to a respective said fixed rail so as to permit slidable reciprocal movements of each said movable rail, and thus said seat frame, relative to said fixed rail; wherein each said movable rail also includes means defining at least one pair of projection members disposed relative to one another in the direction of said reciprocal movements, each said projection member opposingly extending towards said respective fixed rail so as to normally establish a clearance therebetween, said means defining at least one pair of projection members longitudinally spaced along said pair of fixed and movable rails for abutting against said opposing respective fixed rail in response to an excessive load being applied to the seat to distribute the applied load over said opposing respective fixed rail to thereby prevent deformation of said movable rail and said rail flange thereof due to said applied loads.

* * * * *

UNITED STATES PATENT AND TRADEMARK OFFICE
CERTIFICATE OF CORRECTION

PATENT NO. : 4,597,552

DATED : July 1, 1986

INVENTOR(S) : Takaichi NISHINO

It is certified that error appears in the above-identified patent and that said Letters Patent is hereby corrected as shown below:

Title page:

The assignee should be TACHIKAWA SPRING CO., LTD. in Tokyo, Japan

Signed and Sealed this

Eighteenth Day of November, 1986

Attest:

DONALD J. QUIGG

*Attesting Officer*   *Commissioner of Patents and Trademarks*